(12) United States Patent  
Bacinschi

(10) Patent No.: US 9,146,801 B2
(45) Date of Patent: *Sep. 29, 2015

(54) APPLICATION INFORMATION SPECIFIABLE BY USERS AND THIRD PARTIES

(71) Applicant: Business Objects Software Ltd., Dublin 1 (IE)

(72) Inventor: Radim Bacinschi, Vancouver (CA)

(73) Assignee: Business Objects Software Ltd., Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 14/520,138

(22) Filed: Oct. 21, 2014

(65) Prior Publication Data

US 2015/0039947 A1   Feb. 5, 2015

Related U.S. Application Data

(63) Continuation of application No. 13/331,831, filed on Dec. 20, 2011, now Pat. No. 8,887,010.

(51) Int. Cl.
  *G06F 11/00* (2006.01)
  *G06F 11/07* (2006.01)
  *G06F 11/34* (2006.01)

(52) U.S. Cl.
  CPC ........ *G06F 11/0769* (2013.01); *G06F 11/3476* (2013.01); *G06F 2201/86* (2013.01)

(58) Field of Classification Search
  USPC ...................................... 714/57, 46
  See application file for complete search history.

(56) References Cited

U.S. PATENT DOCUMENTS

| | | |
|---|---|---|
| 6,658,645 B1 | 12/2003 | Akuta et al. |
| 8,145,946 B2 | 3/2012 | Hagiuda |
| 2002/0095658 A1 | 7/2002 | Shulman et al. |
| 2002/0178407 A1 | 11/2002 | Ueoka et al. |
| 2003/0001875 A1 | 1/2003 | Black et al. |
| 2003/0065985 A1 | 4/2003 | McGeorge, Jr. |
| 2005/0229045 A1 | 10/2005 | Tamakoshi |
| 2008/0037520 A1 | 2/2008 | Stein et al. |
| 2008/0263398 A1* | 10/2008 | Mori et al. ............ 714/25 |
| 2010/0138701 A1 | 6/2010 | Costantino |

(Continued)

OTHER PUBLICATIONS

"U.S. Appl. No. 13/331,831, Interview Summary mailed Feb. 21, 2014", 3 pgs.

(Continued)

*Primary Examiner* — Sarai Butler
(74) *Attorney, Agent, or Firm* — Schwegman Lundberg & Woessner, P.A.

(57) ABSTRACT

Example systems and methods of generating and distributing user-specified application information are presented. In one example, an informational code to be generated during execution of a software application is accessed. A character string specified by a first user of the software application that is descriptive of the informational code is received. The informational code and the character string are stored in a data storage device, which stores a plurality of information codes in association with corresponding character strings for the software application. The informational code is received in response to the first information code being generated during execution of the software for a second user. The character string is retrieved from the data storage device after the execution of the application based on the informational code, and transmitted for display to the second user.

20 Claims, 10 Drawing Sheets

(56) References Cited

U.S. PATENT DOCUMENTS

2010/0153789 A1* 6/2010 Tajima ............................ 714/46
2013/0007527 A1    1/2013 Petukhov et al.
2013/0159782 A1    6/2013 Bacinschi

OTHER PUBLICATIONS

"U.S. Appl. No. 13/331,831, Non Final Office Action mailed Jan. 16, 2014" 19 pgs.

"U.S. Appl. No. 13/331,831, Notice of Allowance mailed Jul. 8, 2014", 5 pgs.

"U.S. Appl. No. 13/331,831, Response filed Apr. 16, 2014 to Non-Final Office Action mailed Jan. 16, 2014", 11 pgs.

"Creating Custom Error Messages", MSDN, [Online]. Retrieved from the Internet: <URL: http://msdn.microsoft.com/en-us/library/ms524952(v=vs.90).aspx>, (Accessed Dec. 11, 2011), 2 pgs.

* cited by examiner

| IDENTIFYING INFORMATION | CHARACTER STRINGS RETURNED/ TRANSMITTED |
|---|---|
| APPLICATION | ALL CHARACTER STRINGS ASSOCIATED WITH INFORMATIONAL CODES FOR APPLICATION |
| APPLICATION, APPLICATION VERSION | ALL CHARACTER STRINGS ASSOCIATED WITH INFORMATIONAL CODES FOR IDENTIFIED VERSION OF APPLICATION |
| APPLICATION, USER (OR GROUP) NAME | ALL CHARACTER STRINGS ASSOCIATED WITH INFORMATIONAL CODES FOR IDENTIFIED USER (OR GROUP INCLLUDING IDENTIFIED USER) OF APPLICATION |
| APPLICATION, LANGUAGE | ALL CHARACTER STRINGS OF IDENTIFIED LANGUAGE ASSOCIATED WITH INFORMATIONAL CODES FOR APPLICATION |
| APPLICATION, INFORMATIONAL CODE | ALL CHARACTER STRINGS FOR ASSOCIATED INFORMATIONAL CODE FOR APPLICATION |

FIG. 6

APPLICATION INFORMATION SPECIFIABLE BY USERS AND THIRD PARTIES

CROSS-REFERENCE TO RELATED APPLICATIONS

This application is a continuation of prior application Ser. No. 13/331,831, filed on Dec. 20, 2011, which is incorporated by reference herein in its entirety.

FIELD

The present disclosure relates generally to information associated with a software application, and more specifically, to the generation and distribution of information generated during execution of an application, such as, for example, error information, logging information, and tracing information.

BACKGROUND

During the execution of most software applications, whether during use of the software by an end user, or during development and testing by a software engineer or similar user, the application may generate output not directly representative of the primary functionality of the application. Examples of such output may include, but are not limited to, error information, logging information, and trace information. Error information may inform the user of any condition that is exceptional in nature or that may cause the application to perform in an incorrect or unexpected manner. Logging information may inform a user of expected and/or unexpected events that have occurred during the execution of the application, such as an error event, the creation of a file, a change of a state reflected in the application, the initiation or termination of a process, and the like. Trace information, normally provided for the benefit of a software developer, typically indicates which portions of the application have been executed, when such portions were executed, and so on.

At least some of this generated output is in the form of text that provides the information being generated by the application. Such output may be provided in a number of forms to the user, such as by way of presenting the text on a display to the user in real-time during execution of the application, or via storing the text in an electronic file during execution for subsequent viewing. Also, the text is typically specified in parallel with application development so that the text will be available at the time of deployment of the application.

BRIEF DESCRIPTION OF DRAWINGS

The present disclosure is illustrated by way of example and not limitation in the figures of the accompanying drawings, in which like references indicate similar elements and in which:

FIG. 6 is a table of examples of identifying information for selecting one or more character strings to be returned or transmitted to a user of an application;

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

At least some of the embodiments described herein provide various techniques for generating and distributing information that is output during execution of a software application. The information may be any of several different types, including, but not limited to, error information, logging information, and trace information, as described above. In some examples, the application generates an informational code capable of being distinguished from other codes that may be generated by the application. The application may output the informational code in response to some predetermined event or condition occurring during the execution of the application. Each of the informational codes may be associated with one or more character strings or other textual information, one or more of which may be presented to a user of the application, such as by a separate application that executes after execution of the application has completed. As a result, by generating informational codes instead of the textual information or character strings, the application may execute more quickly than if the application generates and outputs the textual information to a display or a file during execution. Further, the textual data need not be generated during development of the application, but may be created afterward by one or more users or other interested third parties not directly associated with the development of the application. Other aspects of the embodiments discussed herein may be ascertained from the following detailed description.

Figure 1:
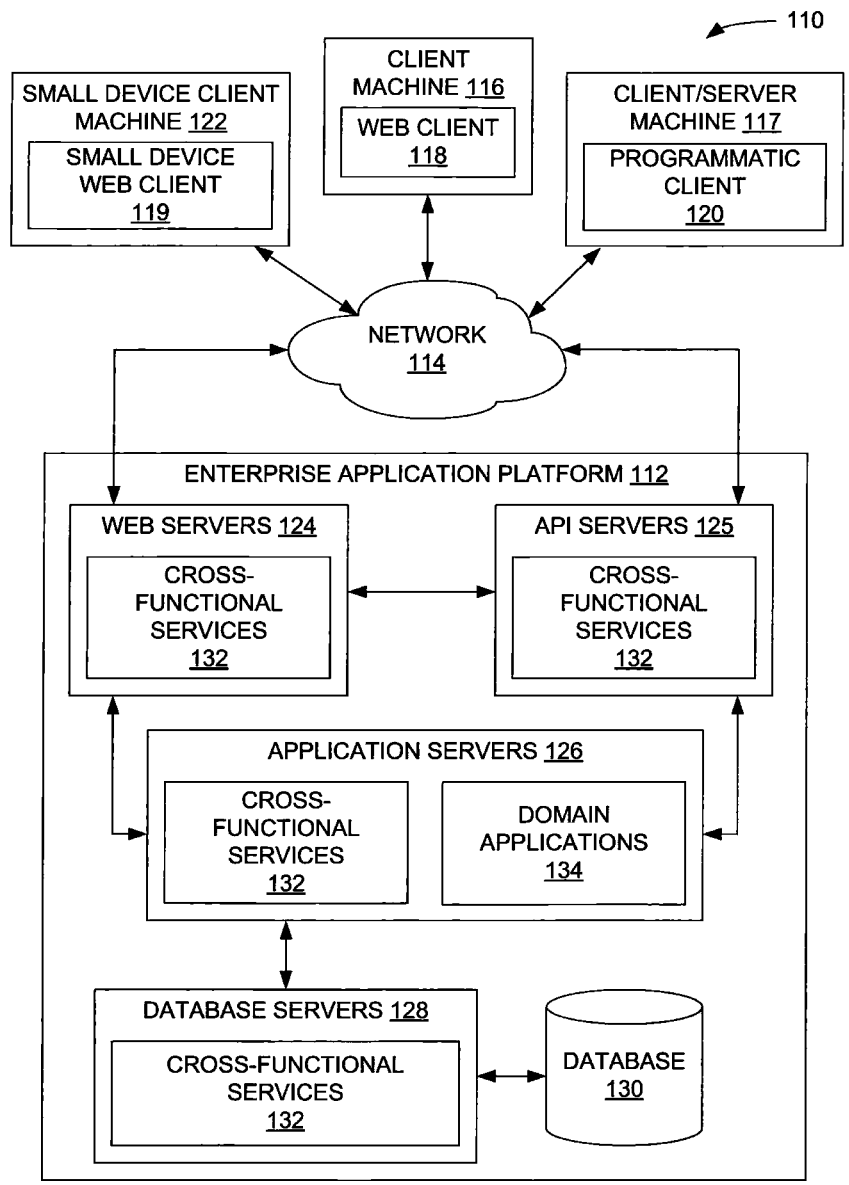
FIG. 1 is a block diagram of an example system having a client-server architecture for an enterprise application platform capable of employing the systems and methods described herein.

FIG. 1 is a network diagram depicting an example system 110, according to one exemplary embodiment, having a client-server architecture configured to perform the various methods described herein. A platform (e.g., machines and software), in the exemplary form of an enterprise application platform 112, provides server-side functionality via a network 114 (e.g., the Internet) to one or more clients. FIG. 1 illustrates, for example, a client machine 116 with a web client 118 (e.g., a browser, such as the Internet Explorer® browser developed by Microsoft Corporation of Redmond, Wash. State), a small device client machine 122 with a small device web client 119 (e.g., a browser without a script engine) and a client/server machine 117 with a programmatic client 120.

Turning specifically to the enterprise application platform 112, web servers 124, and application program interface (API) servers 125 are coupled to, and provide web and programmatic interfaces to, application servers 126. The application servers 126 are, in turn, shown to be coupled to one or more database servers 128 that may facilitate access to one or more databases 130. The web servers 124, application program interface (API) servers 125, application servers 126, and database servers 128 may host cross-functional services 132. The application servers 126 may further host domain applications 134.

The cross-functional services 132 may provide user services and processes that utilize the enterprise application platform 112. For example, the cross-functional services 132 may provide portal services (e.g., web services), database services, and connectivity to the domain applications 134 for users that operate the client machine 116, the client/server machine 117, and the small device client machine 122. In addition, the cross-functional services 132 may provide an environment for delivering enhancements to existing applications and for integrating third party and legacy applications with existing cross-functional services 132 and domain applications 134. Further, while the system 110 shown in FIG. 1 employs a client-server architecture, the present disclosure is of course not limited to such an architecture, and could equally well find application in a distributed, or peer-to-peer, architecture system.

Figure 2:
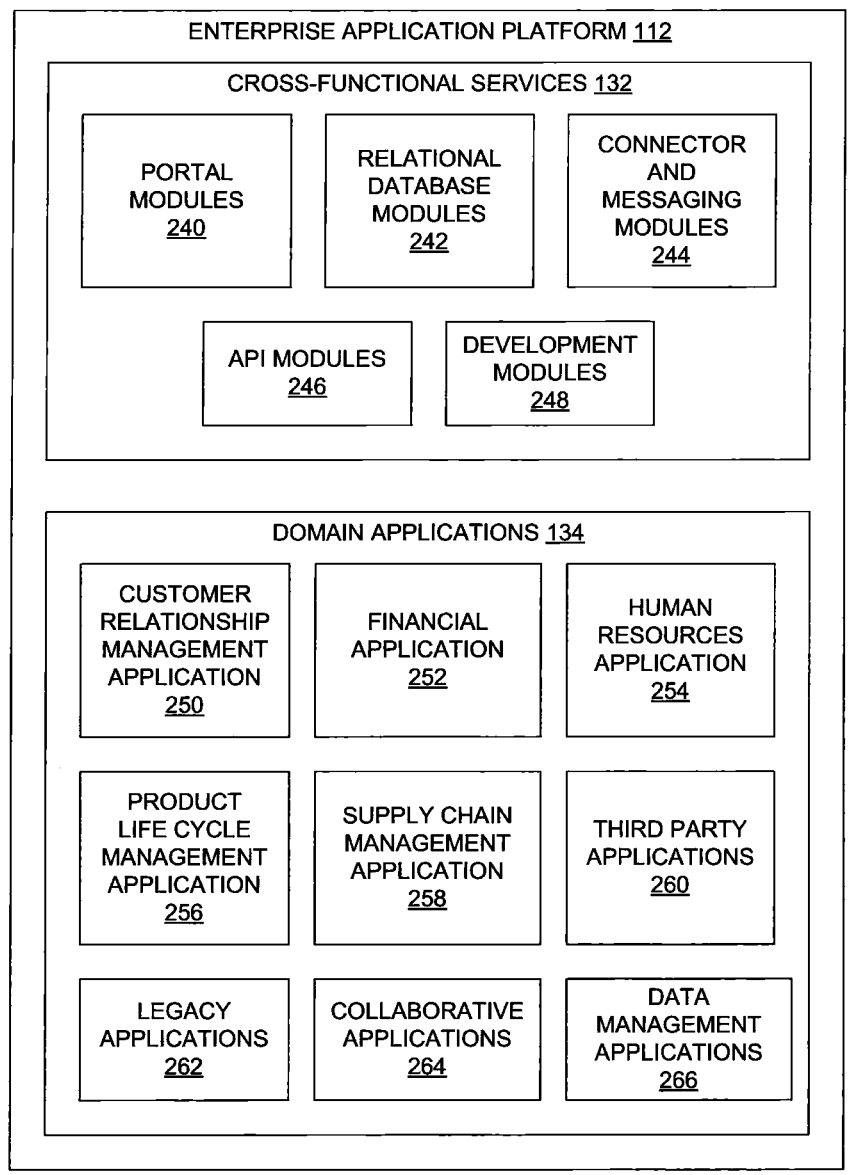
FIG. 2 is a block diagram of example applications and modules employable in the enterprise application platform of FIG. 1.

FIG. 2 is a block diagram illustrating example enterprise applications and services, such as those described herein, as embodied in the enterprise application platform 112, according to an exemplary embodiment. The enterprise application platform 112 includes cross-functional services 132 and domain applications 134. The cross-functional services 132 include portal modules 240, relational database modules 242, connector and messaging modules 244, application program interface (API) modules 246, and development modules 248.

The portal modules 240 may enable a single point of access to other cross-functional services 132 and domain applications 134 for the client machine 116, the small device client machine 122, and the client/server machine 117 of FIG. 1. The portal modules 240 may be utilized to process, author, and maintain web pages that present content (e.g., user interface elements and navigational controls) to the user. In addition, the portal modules 240 may enable user roles, a construct that associates a role with a specialized environment that is utilized by a user to execute tasks, utilize services, and exchange information with other users and within a defined scope. For example, the role may determine the content that is available to the user and the activities that the user may perform. The portal modules 240 may include, in one implementation, a generation module, a communication module, a receiving module, and a regenerating module. In addition, the portal modules 240 may comply with web services standards and/or utilize a variety of Internet technologies, including, but not limited to, Java, J2EE, SAP's Advanced Business Application Programming Language (ABAP) and Web Dynpro, XML, JCA, JAAS, X.509, LDAP, WSDL, WSRR, SOAP, UDDI, and Microsoft .NET.

The relational database modules 242 may provide support services for access to the database 130 (FIG. 1) that includes a user interface library. The relational database modules 242 may provide support for object relational mapping, database independence, and distributed computing. The relational database modules 242 may be utilized to add, delete, update, and manage database elements. In addition, the relational database modules 242 may comply with database standards and/or utilize a variety of database technologies including, but not limited to, SQL, SQLDBC, Oracle, MySQL, Unicode, and JDBC.

The connector and messaging modules 244 may enable communication across different types of messaging systems that are utilized by the cross-functional services 132 and the domain applications 134 by providing a common messaging application processing interface. The connector and messaging modules 244 may enable asynchronous communication on the enterprise application platform 112.

The application program interface (API) modules 246 may enable the development of service-based applications by exposing an interface to existing and new applications as services. Repositories may be included in the platform as a central place to find available services when building applications.

The development modules 248 may provide a development environment for the addition, integration, updating, and extension of software components on the enterprise application platform 112 without impacting existing cross-functional services 132 and domain applications 134.

Turning to the domain applications 134, the customer relationship management applications 250 may enable access to and facilitate collecting and storing of relevant personalized information from multiple data sources and business processes. Enterprise personnel that are tasked with developing a buyer into a long-term customer may utilize the customer relationship management applications 250 to provide assistance to the buyer throughout a customer engagement cycle.

Enterprise personnel may utilize the financial applications 252 and business processes to track and control financial transactions within the enterprise application platform 112. The financial applications 252 may facilitate the execution of operational, analytical, and collaborative tasks that are associated with financial management. Specifically, the financial applications 252 may enable the performance of tasks related to financial accountability, planning, forecasting, and managing the cost of finance.

The human resources applications 254 may be utilized by enterprise personnel and business processes to manage, deploy, and track enterprise personnel. Specifically, the human resources applications 254 may enable the analysis of human resource issues and facilitate human resource decisions based on real-time information.

The product life cycle management applications 256 may enable the management of a product throughout the life cycle of the product. For example, the product life cycle management applications 256 may enable collaborative engineering, custom product development, project management, asset management, and quality management among business partners.

The supply chain management applications 258 may enable monitoring of performances that are observed in supply chains. The supply chain management applications 258 may facilitate adherence to production plans and on-time delivery of products and services.

The third-party applications 260, as well as legacy applications 262, may be integrated with domain applications 134 and utilize cross-functional services 132 on the enterprise application platform 112.

Additionally, the collaborative applications 264 may facilitate joint creation and modification of documents and other work product by multiple users, and the data management applications 266 may enable data organization and other management functions to be performed on data generated by one or more other domain applications 134.

Figure 3A:
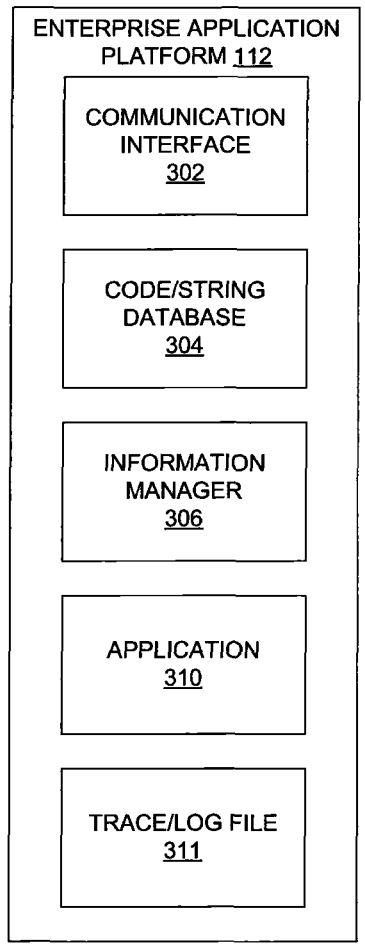
FIG. 3A is a block diagram of example modules utilized in the enterprise application platform of FIG. 1 for systems and methods of generating and distributing application information.

FIG. 3A is a block diagram of example modules employable in the enterprise application platform 112 of FIG. 1 for systems and methods of generating and/or distributing application information. In the example of FIG. 3A, the enterprise application platform 112 includes a communication interface module 302, a code/string database module 304, an information manager module 306, an application 310, and a trace/log file 311. In some implementations, one or more of these modules may be incorporated in other modules of the enterprise application platform 112. For example, the communication interface module 302 may exist as one of the portal modules 240 (FIG. 2), while the code/string database module 304 may be one of the relational database modules 242 (also FIG. 2). Further, any of the modules 302 through 311 may be combined into fewer modules, or may be partitioned into a greater number of modules.

The communication interface module 302 may allow the transmission and/or receipt of information between the enterprise application platform 112 and other devices, such as the client machines 116, 117, and 122 of FIG. 1. In one example, communication may occur over the network 114 shown in FIG. 1, which may be a wide-area network (WAN), such as the Internet, but other networks, such as a local-area network (LAN) implemented via Ethernet or Wi-Fi®, may be employed in other implementations. As explained below, the information being transmitted and received may include informational codes generated by a software application, character strings that are representative or descriptive of the informational codes, and various identifying information related to either or both of the informational codes and the character strings. In some examples, the communication interface module 302 may also provide a user interface, such as a web-based interface, for a user of a client machine 116, 117, and 122. In one embodiment, the software application may be one of the domain applications 134 provided on the enterprise application platform 112, or may be an application executing on a client machine 116, 117, and 122 or elsewhere.

Figure 4:
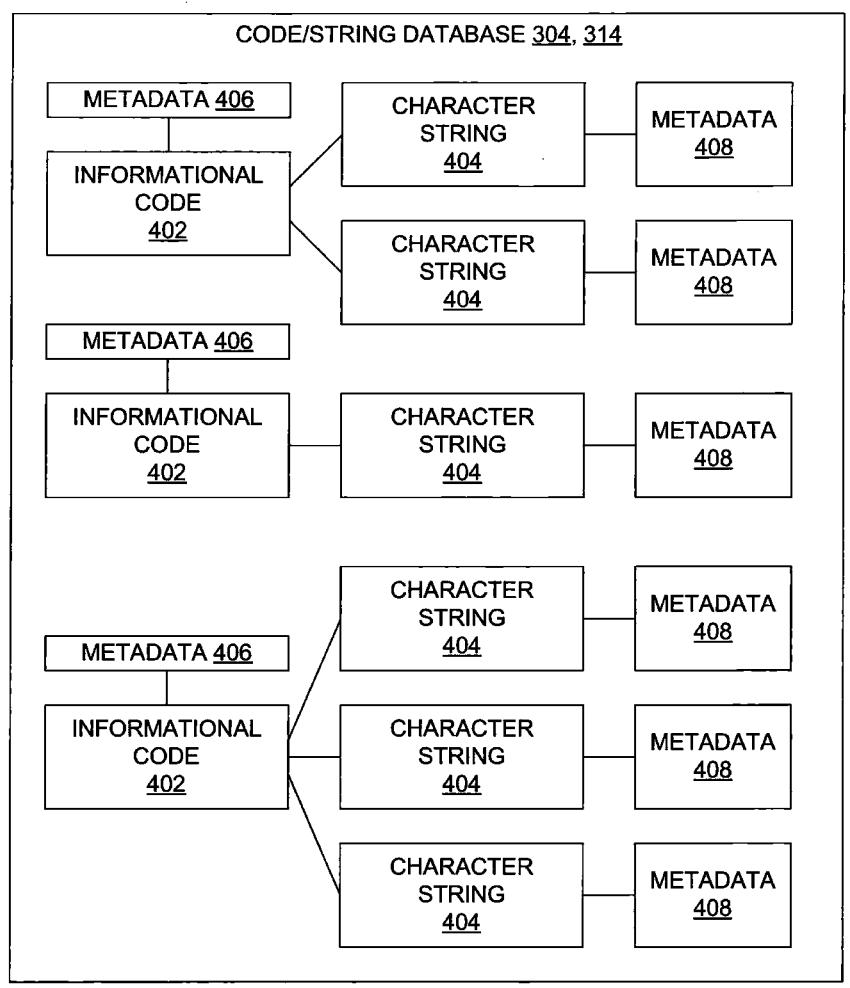
FIG. 4 is a block diagram of an example database of FIGS. 3A and 3B relating informational codes to associated character strings.

The code/string database 304 may store informational codes to be generated by one or more software applications, in conjunction with their associated textual information, such as character strings. In addition, the code/string database 304 may also include metadata that describes various aspects of either or both of the informational codes and the character strings. In one example, the code/string database 304 may simply be one or more files or data objects containing the various informational codes, textual information, and metadata. In another example, the code/string database 304 may be a relational database system including the information described above. FIG. 4, discussed below, describes an example of the data stored in the code/string database 304.

The information manager module 306 may manage the storage and retrieval of the information residing in the code/string database 304, as well as control the reception and distribution of information via the communication interface module 302 with application users and third parties. In addition, the information manager module 306 may perform at least some of the information reception and distribution via a graphical user interface (GUI), such as may be provided by way of a web-based interface.

The application 310 generates the informational codes which are associated with the character strings that are ultimately provided to the user of the application 310. In cases in which the application 310 is configured to generate logging or tracing data, the resulting informational codes may be stored in the trace/log file 311. The stored informational codes may then be used to generate the character strings that are ultimately presented to the user of the application 310.

While each of the modules 302-311 identified in FIG. 3A are shown as being implemented via the enterprise application platform 112 (FIG. 1), one or more of the modules 302-311 may be implemented within a separate computer system or platform not shown in FIG. 1. For example, a separate computer system accessible by a provider of character strings associated with various informational codes of one or more software applications may include one or more of the modules 302-311 of FIG. 3A. Such a system may be accessible, for example, as a website, webpage, web service, or other network-accessible system.

Figure 3B:
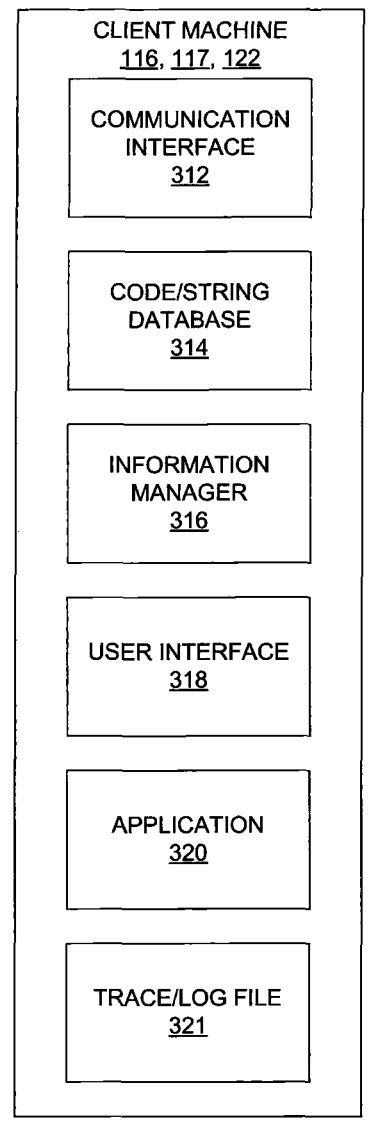
FIG. 3B is a block diagram of example modules utilized in a client machine of FIG. 1 for systems and methods of generating and distributing application information.

In another embodiment, FIG. 3B is a block diagram of example modules for a client machine 116, 117, or 122 coupled with the enterprise application platform 112 of FIG. 1 for generating and/or distributing application information. In the example of FIG. 3B, the client machine 116, 117, or 122 includes a communication interface module 312, a code/string database module 314, an information manager module 316, a user interface module 318, an application 320, and a trace/log file 321. In other implementations, any of the modules 312 through 321 may be combined into fewer modules, or may be partitioned into a greater number of modules. Further, one or more of the modules 312-321 may be provided in another system or machine, such as the enterprise application platform 112 of FIG. 1.

Each of the communication interface 312, the code/string database module 314, the information manager module 316, the application 320, and the trace/log file 321 may perform operations at least similar to those described above with respect to the enterprise application platform 112 shown in FIG. 3A.

The user interface module 318 may provide a textual or graphical user interface allowing a user of the application 320 to access, specify, and view the textual information associated with one or more informational codes from the application 320. Examples of such a graphical user interface are provided in FIGS. 7A, 7B, 8, and 9, described below. As also shown in FIG. 3B, the client machine 116, 117, or 122 may include one or more applications 320 that generate informational codes that are described by the textual information to be generated and provided to the user of the client machine 116, 117, or 122.

Given the enterprise application platform 112 of FIG. 3A, the client machine 116, 117, 122 of FIG. 3B, a third-party system structured as in either FIG. 3A or FIG. 3B, and/or some combination thereof, a flexible architecture for the generation and distribution of information related to the execution of a software application may be provided. For example, the application itself may be executed in the client machine 116, 117, 122, the enterprise platform 112, or some other system. Also, the character strings or other textual information may be created by the user or administrator of the application at the client machine 116, 117, 122, by a developer via the enterprise application platform 112, or by a third party by way of a third party system. In one example, the third party may be a person serving in a specialized role as author or creator of the textual information. Such a person may be skilled in one or more alternate languages or dialects. In another example, such a person may be trained in providing messages appropriate for users of varying levels of familiarity with the software application. The created textual information may be stored at, and retrieved from, the enterprise application platform 112, the client machine 116, 117, 122, or another system having a data storage device. In some examples, all pertinent textual information for a particular application may be made available prior to execution of the application, or may be retrieved and presented for display to the user on an as-needed basis during or after the execution of the application. The textual information presented to a particular user may depend on other identifying information, such as the identity of the application being executed, the version of the application being executed, an identity of a component of the application, the name of the application user, a group of users with which the application user is identified, the desired language of the user, and the like. Other implementations and systems for the generation, distribution, and presentation of the textual information are also possible.

In some examples, both the enterprise application platform 112 and the client machine 116, 117, 122 may include portions of either or both of the code/string database 304, 314 and the trace/log file 311, 321. For example, the client machine 116, 117, 122 may cache informational codes and associated character strings in a local code/string database 314 that are pertinent to an application being used by a user of the client machine 116, 117, 122 from a larger, more comprehensive code/string database 304 in the enterprise application platform 112. In another example, an application 310 executing on the enterprise application platform 112 may generate log or trace data and store that data in its trace/log file 311. The client machine 116, 117, 122, in response to a user request to read the resulting log or trace data, may then retrieve the informational codes from the trace/log file 311 of the enterprise application platform 112, and also retrieve from a code/string database 304, 314 at least those character strings associated with the informational codes stored in the trace/log file 311 for display to the user.

FIG. 4 is a block diagram of an example of the code/string database 304, 314 of FIGS. 3A and 3B, respectively. In this example, the database 304, 314 includes multiple informational codes 402, each of which is associated with at least one character string 404. In other embodiments, more than one informational code 402 may be logically coupled to the same character string 404. In one example, each of the informational codes 402 is a short numerical value (for example, a binary or hexadecimal code) that is unique from other informational codes 402 that may be output by the same application. By keeping the informational code 402 as short or small as possible, the amount of time the application expends to output the informational code 402 to a display, file, or data object may be minimized, thus reducing the effect of the output on the execution of the application, thereby improving application performance.

Examples of the informational codes 402 may represent, but are not limited to, error indications, logging entries, and trace output. Error indications may include any information regarding an event occurring during the execution of the application that may be considered an error, fault, or other unexpected event. Examples of errors may include, but are not limited to, premature termination of the application, invalid data being provided to the application, an improper or failed memory or disk access, a lack of memory or disk space to continue execution of the application, and a hardware or software failure.

Logging entries may include information describing an expected or unexpected event resulting from execution of the application. In addition to the errors and other unexpected events noted above, the logging entries or information may include references to expected occurrences, such as a user logging in to the application, a normal state change of the application, the expected initiation or termination of a process, and the like. Generally, the logging information is written to a log file for perusal by a user or other person subsequent to the execution of the application.

Trace output information, in one example, may be information indicating which lines or statements of source code for the application were executed. In some implementations, a trace informational code 402 is output every few lines (such as, for example, ten lines) to provide a somewhat high-resolution view of the execution path taken through the source code of the application. Generally, application developers, testers, and/or customer service representatives may utilize such information to determine an appropriate resolution to a problem, and to evaluate the overall performance of the application and various portions therein. Similar to logging information, trace information is often written to a trace file for subsequent review by interested parties after execution of the application.

In one implementation, the character strings 404 or other textual information may be of an indeterminate length, possibly limited to some maximum number of characters. The character strings 404 may also be expressed in any format that may be interpreted and presented to a user, including, but not limited to, the American Standard Code for Information Interchange (ASCII) and HyperText Markup Language (HTML). In one example described below, a character string 404 may also include one or more variables which may be replaced within a specific character string selected by way of some identifying information before presentation to the application user.

In example embodiments discussed herein, the application generates one or more informational codes during execution of the application, with the codes being stored in a file or other type of memory structure. Accordingly, the amount of data being generated by the application for error notification, logging, or tracing purposes is limited. After execution of the application, the informational codes may then be used to generate corresponding textual information, such as character strings, for presentation to the user, such as in a file or other format. As a result, more human-readable information is provided to the user without requiring the application to generate that information directly. Thus, as opposed to requiring the application to produce the human-readable information, which may negatively impact the performance of the application, and thus taint the generated information due to possible alteration of the execution of the application, delaying the generation of the human-readable information until after application execution is complete (or at least until execution of the application is paused) may, in at least some embodiments, reduce the negative effect of providing the error, logging, and trace information, thus enhancing the value of that information.

In one example database 304, 314, each of the informational codes 402 may be associated with separate metadata 406. Similarly, each of the characters strings 404 may be associated with other metadata 408. While FIG. 4 shows every information code 402 and character string 404 being associated or coupled with its own specific metadata 406, 408, such may not be the case in other embodiments. In some implementations, for example, some informational codes 402 and/or character strings 404 may not be associated with any metadata 406, 408. In other cases, more than one informational code 402 or character string 404 may be associated with the same metadata 406, 408.

Generally, the metadata 406, 408 for the informational codes 402 and the character strings 404 may aid the information manager module 306, 316 (FIGS. 3A and 3B) in determining, retrieving, and providing the appropriate character strings 404 for a particular user under a specific set of circumstances. In such instances, the metadata 406, 408 may serve as identifying information by which proper character strings 404 are selected for a particular user or groups of users.

The metadata 406 for an informational code 402 may, in one implementation, indicate a particular application that may output the informational code 402. In addition, the metadata 406 may also identify a version of the application in the scenario in which the same informational code 402 may represent different events or data for different versions of the same application. In other examples, the metadata 406 may include a reference to a component of the application associated with the informational code 402 of interest. The metadata 406 for an informational code 402 may also include other identifying information for the informational code 402 in other examples.

Correspondingly, the metadata 408 for one or more character strings 404 may include identifying information for its associated character strings 404. Such identifying information may include, but is not limited to, an application, an application version, a component of the application, an identity of one or more users, an identity of one or more user groups, and an identity of the human-readable language in which the character string 404 is written. In some cases, the metadata 408 may include an indication of the one or more informational codes 402 with which the character string 404 is associated. As a result of identifying the informational codes 402 in such a manner, an additional explicit logical coupling or link between the character string 404 and the one or more informational codes 402, as shown in FIG. 4, may not be needed.

The informational codes 402, character strings 404, and any associated metadata 406, 408 may be arranged according to any type of data structure that facilitates the association of the various data with each other as described above. In one example, a data table may list each informational code 402/character string 404 pairing as a separate entry, with each entry also including the various metadata 406, 408 associated with that entry. In another example, each informational code 402, character string 404, or pairing thereof, may be represented as a separate data object, with the associated objects linked to each other via pointers or other constructs. Each such data object may include the metadata 406, 408 corresponding to that object, or may be represented as separate data objects. Other types of data structures, or combinations thereof, may be utilized in other embodiments.

Figure 5A:
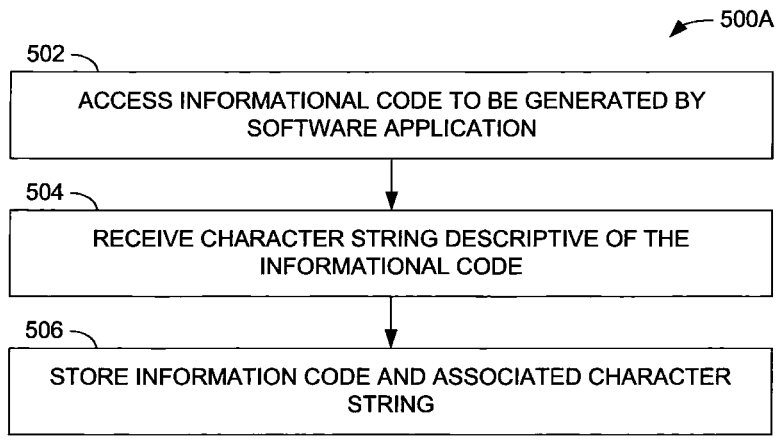
FIG. 5A is a flow diagram of an example method of generating and storing a character string associated with an informational code of an application.
Figure 5B:
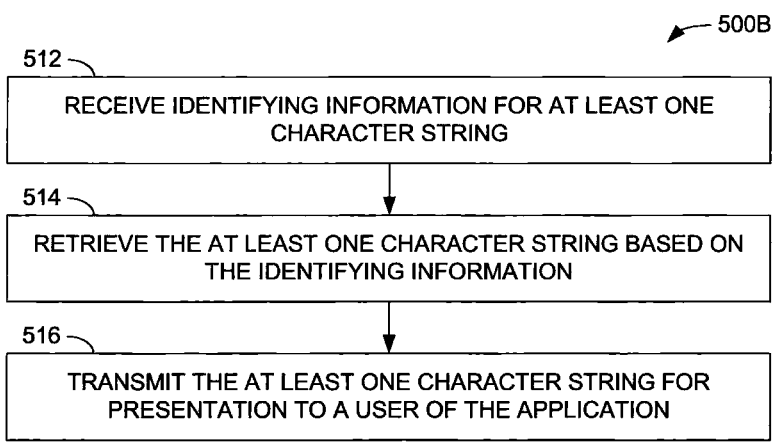
FIG. 5B is a flow diagram of an example method of distributing a previously generated character string associated with an informational code of an application.

FIGS. 5A and 5B are flow diagrams illustrating example methods of generating, storing, and distributing textual information, such as character strings, that is output by applications to users of those applications. More specifically, FIG. 5A depicts a method of generating and storing character strings for informational codes, while FIG. 5B illustrates the retrieval and transmission of the stored strings.

In one example of FIG. 5A, the generation and storage of the character strings may occur after the development and deployment of the application. As a result, parties other than the software developers, application testers, or other entities associated the development of the application may provide the character strings based on hands-on experience with the application not available to the application developers.

In the method 500A, at least one informational code to be generated by the software application is accessed (operation 502). In one implementation, the application development team provides a list of possible informational codes to be generated by the application. In an alternate example, a list of informational codes may be produced based on actual execution of the application and collection of the informational codes being output.

Also, at least one character string that is descriptive of the informational code is received (operation 504). Such a character string may be specified by a developer or other person involved in the development, testing, and/or maintenance of the application. In other examples, an end user of the application may provide the character string. Third parties not directly related to either the development or use of the application may also provide the character strings in other instances.

The generated character string, along with its associated informational code, may then be stored (operation 506) for subsequent retrieval. Additionally, either or both of the informational codes and the character strings may also be accompanied with identifying information, as described above. For example, if an end user provides a character string, an identity of the user, or an identity of a group of people with which the user is associated, or a particular language employed by the user, may be stored as metadata in conjunction with the character string.

As a result of applying the method 500A to each informational code associated with an application, each informational code is associated with at least one character string, thus converting the informational codes into information that is useful to one or more users. In the case of multiple character strings being associated with a single informational code, each character string may be targeted to a different audience. For example, each of a plurality of users may specify their own character string. In other situations, a character string may be intended for a particular group of people based on their role relative to the application (for example, an end user or developer), their function or title within a business organization (for example, engineer or salesperson), the primary language spoken by the user, or other aspects or characteristics associated with the users.

In the method of 500B of FIG. 5B, which illustrates the retrieval and transmission of one or more character strings to a user, some identifying information for at least one character string is received (operation 512). As mentioned earlier, the identifying information may include an identity of a user or user group, an identity of the application or version thereof, an indication of the language in which the character string is written, and so on.

One or more character strings are then retrieved based on the received identifying information (operation 514). Examples of the identifying information for a character string and/or associated informational code, as well as the types of character strings that may be returned in response to the identifying information, are presented in FIG. 6, discussed below. The retrieved character strings are transmitted to a user of the application (operation 516).

In one implementation, the method 500B of FIG. 5B may be performed on an informational-code-by-informational-code basis. For example, presuming the existence of a file containing multiple informational codes generated by an application, each information code in the file may be received, and one or more character strings may be returned for each information code. In another example, one or more character strings for each of multiple informational codes for a particular application may be provided in response to a single request for the character strings. In one example, the provided character strings may then be stored at a client machine 116, 117, 122 or enterprise application platform 112, where the character strings may then be used to convert informational codes generated by the application into human-readable form.

While the operations of the methods 500A and 500B of FIGS. 5A and 5B are shown in a specific order, other orders of operation, including possibly concurrent execution of at least portions of one or more operations, may be possible in some implementations.

FIG. 6 provides a table 600 illustrating example types of identifying information 602 that may be provided in a request to retrieve stored character strings, and the types of character strings 604 that may be returned in response to the request. In one example, in response to providing an identity of the application, all character strings associated with all informational codes for the application may be returned. If both the identity of the application and an indication of the particular version of the application are provided, all character strings for all informational codes for that particular version of the application may be provided. If, instead, the application and an identity of a particular user (or user group) of interest are received, the character strings for all informational codes of the application that are associated with the identified user or group may be provided. In another example, all character strings for the application that are expressed in a particular language may be provided in response to receiving the identities of the application and the language. In cases in which only character strings for a particular informational code are of interest, only the application and the informational code may be received.

While FIG. 6 depicts several examples of the identifying information 602 and corresponding types of character strings 604, other types of identifying information 602 not specifically noted therein, as well as any combination of different types of identifying information 602, may be provided in a request in order to receive the desired characters strings.

As mentioned above, a character string may include one or more variables, which may be replaced with textual information denoted by that variable before storage of the character string, or before presentation of the character string to a user. For example, the variable may denote a user name, a service representative name, and/or a telephone number for the representative. Before presentation to the user, the actual names of the user and the service representative, along with the telephone number, may be inserted into the character string to personalize and update the string, such as "John, please call Phil at 303-555-1234." Other uses for variables in the character strings, employing different types of data, may be employed in other examples.

In an example related more specifically to trace data, each of the created character strings, instead of being displayed to a user, may indicate a specific location within a source file of the application. For example, the character string may specify a file name and a line number within the source file at which the application outputs the associated informational code. That character string may then be used to display the actual line of interest within the source file, providing the user with information regarding which portion of the application was executing at the time of a failure or other event. Further, based on such tracing or logging information, a developer of the application may gain knowledge regarding which portions of the application are executed most often, which produce more errors, and so on, and then use that knowledge to revise or upgrade the application, in addition to troubleshooting current problems.

Figure 7A:
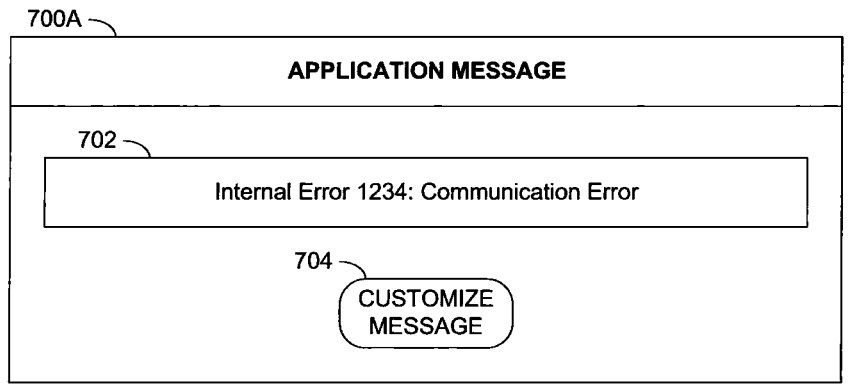
FIGS. 7A and 7B are example graphical user interfaces for facilitating generation by an application user of a character string associated with an informational code of the application.

FIGS. 7A, 7B, 8, and 9 provide example graphical user interfaces that may be utilized in the generation and/or selection of character strings by a user. Such user interfaces may be provided locally in a client machine 116, 117, 122 (FIG. 1), provided over a network by way of an enterprise application platform 112 (FIG. 1), presented through a web page, web service, or "wiki" provided by a third party, or via some other means. In one example, FIG. 7A depicts a graphical user interface 700A in which a particular application message (character string) 702 is presented. In some examples, such an application message may be presented to an end-user or other party before, during, or after execution of an application. In addition, the user may be provided with a "Customize Message" button 704 to allow the user to replace the current character string with another. In situations in which no pre-existing character string is available, the user may be presented only with the informational code involved.

Figure 7B:
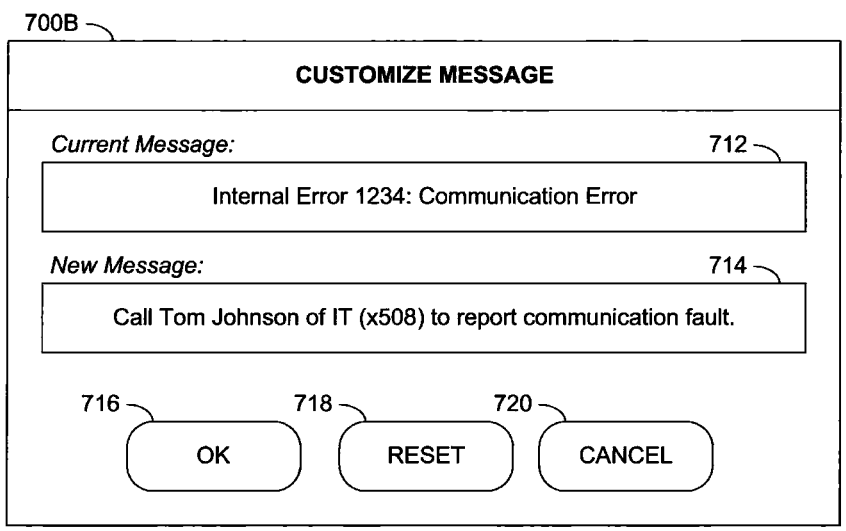

In response to the "Customize Message" button 704 being activated, a "Customize Message" window or interface 700B, as shown in FIG. 7B, may be presented, in which the currently available message 712 is presented, along with a fillable field 714 in which the user may type or paste a new message. For example, the user may want to provide the user or associated co-workers with a message that provides guidance for performing an ameliorative action, such as calling a particular customer service representative to address the problem denoted by the informational code. To set the new typed message as the current message or character string, the user may activate an "OK" button 716. To reset the character string to some default message, the user may activate a "Reset" button 718. To cancel the changes to the character string and restore the current message 712, the user may activate a "Cancel" button 720. In some examples, the user may also specify a particular audience, user group, or the like that may have access to the created message or character string in the fillable field 714. For instance, a system administrator may reserve the message for a particular group of users.

Figure 8:
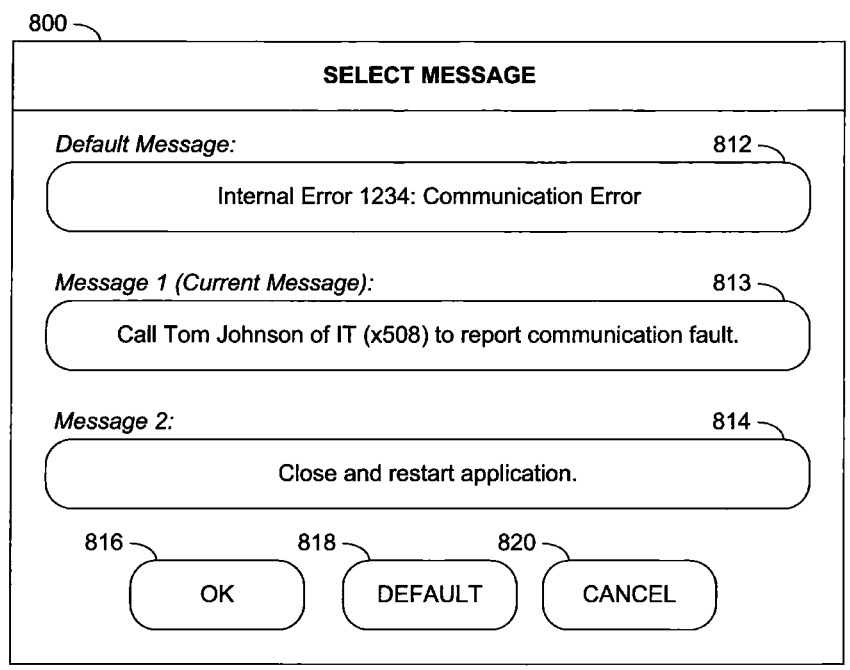
FIG. 8 is an example graphical user interface for user selection of a character string associated with an informational code of the application from multiple preexisting character strings.

In another example, depicted in the graphical user interface 800 of FIG. 8, multiple preexisting character strings or messages 812, 813, 814 may be displayed to a user, such as in response to the user activating the "Customize Message" button 704 of FIG. 7A. In one example, a different user has created each of the messages 812, 813, 814, with one of the messages being denoted as a default message 812, and another message 813 being the current message to be presented to the user. The user may then select one of the messages 812, 813, 814 for presentation to the user in response to the application outputting the associated informational code during execution. After the user makes the selection, the user may activate an "OK" button 816 to enter the selection, activate the "Default" button 818 to restore the default message 812 as the current message, or activate the "Cancel" button 820 to retain the current message 813. In one example, the order in which the messages 812, 813, 814 are presented in the user interface 800 may be determined in part by the relative popularity of the messages with other users of the application. For example, another user interface display (not shown) may allow users to vote explicitly for their favorite message, with the overall results determining the order in which the messages 812, 813, 814 are shown to other users. In another example, the voting may be implicitly performed based on the number of users that have selected a particular message 812, 813, 814 for their own use.

In one example, the functionality of graphical user interfaces 700B and 800 may be combined to allow the user to either select a preexisting message or create a new message.

Figure 9:
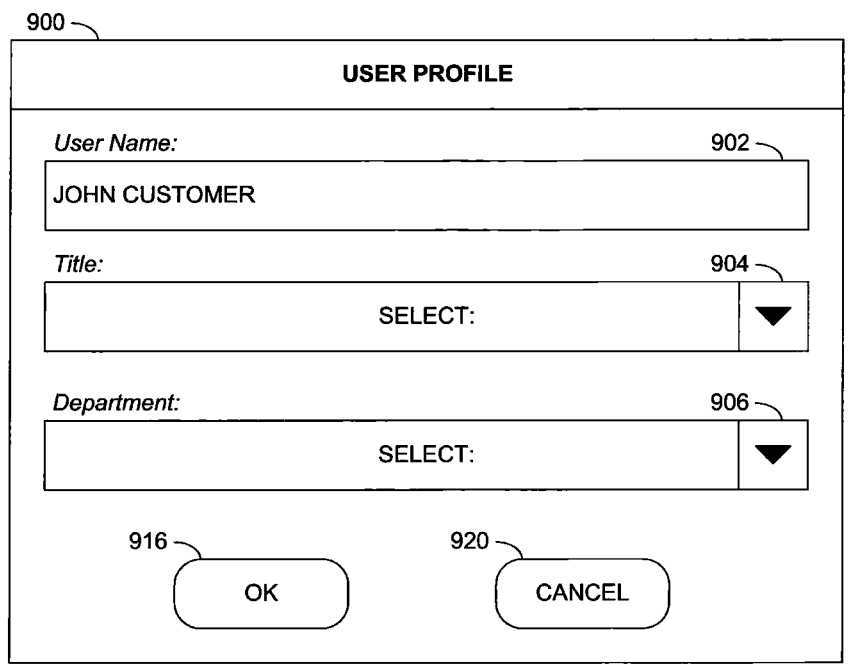
FIG. 9 is an example graphical user interface for user identification to automatically select a character string associated with an informational code of the application from multiple preexisting character strings.

FIG. 9 presents another example graphical user interface 900 in which a user may provide information identifying the user, which may then be employed to provide character strings that are applicable to the user. In this particular example graphical user interface 900, the user may type in a name in a user name field 902, as well as select a business title and department or organization by way of two pull-down menus 904, 906, respectively. Any changes the user indicates may then be selected via an "OK" button 916 or canceled via a "Cancel" button 920. In other examples, other types of identifying information for the user, such as a desired language, may be entered in a similar manner. In other examples, a user may enter identifying information not specifically associated with the user, such as a name of the application, a version number of the application, and so forth, using a similar user interface.

In at least some embodiments discussed herein, an executing application generates and outputs short informational codes, after which a system retrieves their associated character strings to be viewed or consumed by a user. By generating the informational codes instead of the longer strings, the application may execute at nearly the same speed regardless of whether troubleshooting functions like tracing and logging are enabled. Therefore, errors occurring during the execution of the application should be more repeatable due to the lessened effect of tracing and logging on execution, possibly resulting in expedited problem resolution.

Further, given the separation of the generation of the textual information from the development of the application, the generation of at least some of the character strings may be delayed relative to the development of the application, allowing users and other third parties to create the textual information. In some examples, the third parties may be positioned to charge a fee for this service, such as by way of providing access to the textual information via an online marketplace. The entity responsible for generating the application may also contract with the third party to provide the textual information in some implementations. Furthermore, creation of the strings by end users or third parties serves to offload the responsibility for generating the strings from personnel tasked with developing the application. Translation or localization into multiple languages may also be facilitated using this same mechanism, possibly based on a preexisting set of character strings created by another party. Further, subsequent and periodic modification of the character strings to more accurately describe the informational code or to provide guidance regarding a solution to a problem in the application may be based on additional experience with the application that is not normally available during the development phase. The experience of multiple users of a user community may also be combined in such an environment, possibly allowing users to vote on the most useful character strings to be provided to other users of the community.

While the above discussion focuses on enterprise applications and platforms and their associated client systems, any device executing software or firmware may benefit from application of the various principles described herein. For example, users and third parties may create character strings for error messages, logging and tracing data, and the like for both general-purpose computing systems, as well as special-purpose embedded systems, such as cellular phones, personal digital assistants (PDAs), computer tablets, entertainment system components, "smart" appliances, gaming systems, and so on.

Figure 10:
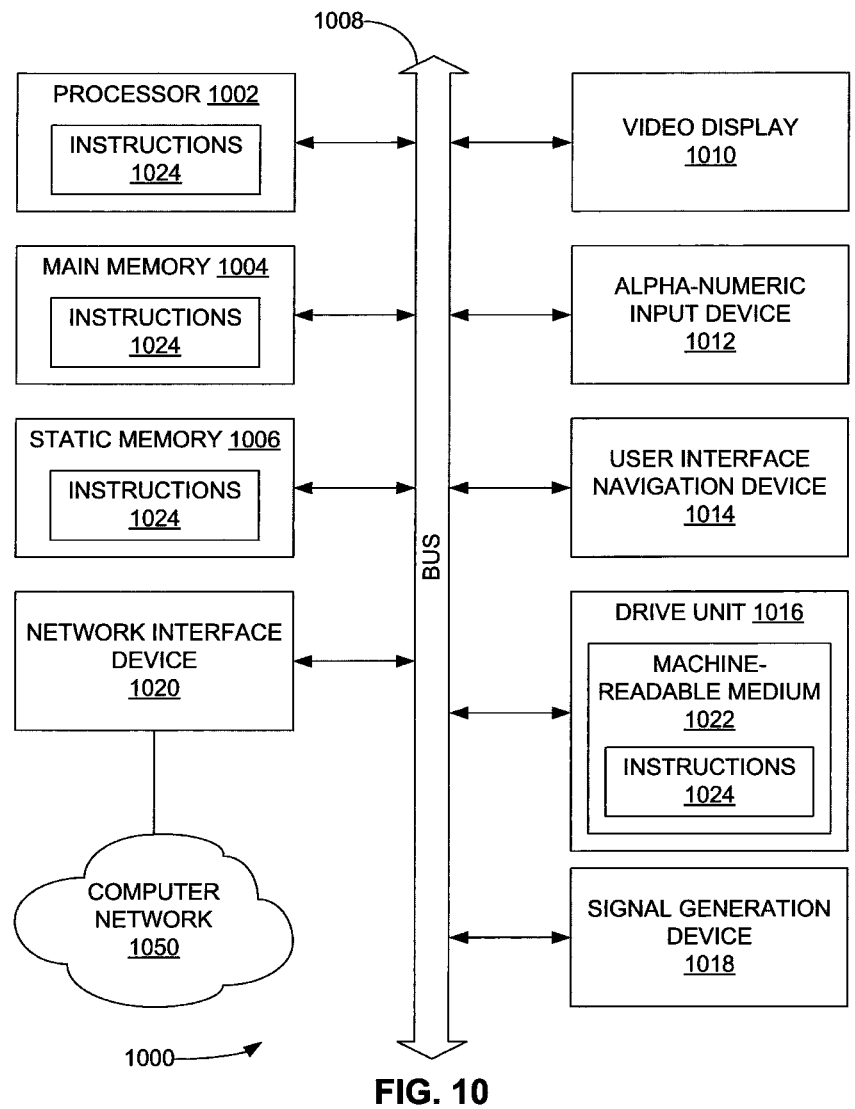
FIG. 10 depicts a block diagram of a machine in the example form of a processing system within which may be executed a set of instructions for causing the machine to perform any one or more of the methodologies discussed herein.

FIG. 10 depicts a block diagram of a machine in the example form of a processing system 1000 within which may be executed a set of instructions for causing the machine to perform any one or more of the methodologies discussed herein. In alternative embodiments, the machine operates as a standalone device or may be connected (for example, networked) to other machines. In a networked deployment, the machine may operate in the capacity of a server or a client machine in a server-client network environment, or as a peer machine in a peer-to-peer (or distributed) network environment.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the processing system 1000 includes a processor 1002 (for example, a central processing unit (CPU), a graphics processing unit (GPU), or both), a main memory 1004 (for example, random access memory), and static memory 1006 (for example, static random-access memory), which communicate with each other via bus 1008. The processing system 1000 may further include video display unit 1010 (for example, a plasma display, a liquid crystal display (LCD), or a cathode ray tube (CRT)). The processing system 1000 also includes an alphanumeric input device 1012 (for example, a keyboard), a user interface (UI) navigation device 1014 (for example, a mouse), a disk drive unit 1016, a signal generation device 1018 (for example, a speaker), and a network interface device 1020.

The disk drive unit 1016 (a type of non-volatile memory storage) includes a machine-readable medium 1022 on which is stored one or more sets of data structures and instructions 1024 (for example, software) embodying or utilized by any one or more of the methodologies or functions described herein. The data structures and instructions 1024 may also reside, completely or at least partially, within the main memory 1004, the static memory 1006, and/or within the processor 1002 during execution thereof by processing system 1000, with the main memory 1004 and processor 1002 also constituting machine-readable, tangible media.

The data structures and instructions 1024 may further be transmitted or received over a computer network 1050 via network interface device 1020 utilizing any one of a number of well-known transfer protocols (for example, HyperText Transfer Protocol (HTTP)).

Certain embodiments are described herein as including logic or a number of components, modules, or mechanisms. Modules may constitute either software modules (for example, code embodied on a machine-readable medium or in a transmission signal) or hardware modules. A hardware module is a tangible unit capable of performing certain operations and may be configured or arranged in a certain manner. In example embodiments, one or more computer systems (for example, the processing system 1000) or one or more hardware modules of a computer system (for example, a processor 1002 or a group of processors) may be configured by software (for example, an application or application portion) as a hardware module that operates to perform certain operations as described herein.

In various embodiments, a hardware module may be implemented mechanically or electronically. For example, a hardware module may include dedicated circuitry or logic that is permanently configured (for example, as a special-purpose processor, such as a field-programmable gate array (FPGA) or an application-specific integrated circuit (ASIC)) to perform certain operations. A hardware module may also include programmable logic or circuitry (for example, as encompassed within a general-purpose processor 1002 or other programmable processor) that is temporarily configured by software to perform certain operations. It will be appreciated that the decision to implement a hardware module mechanically, in dedicated and permanently configured circuitry, or in temporarily configured circuitry (for example, configured by software) may be driven by cost and time considerations.

Accordingly, the term "hardware module" should be understood to encompass a tangible entity, be that an entity that is physically constructed, permanently configured (for example, hardwired) or temporarily configured (for example, programmed) to operate in a certain manner and/or to perform certain operations described herein. Considering embodiments in which hardware modules are temporarily configured (for example, programmed), each of the hardware modules need not be configured or instantiated at any one instance in time. For example, where the hardware modules include a general-purpose processor 1002 that is configured using software, the general-purpose processor 1002 may be configured as respective different hardware modules at different times. Software may accordingly configure a processor 1002, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmissions (such as, for example, over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (for example, a collection of information).

The various operations of example methods described herein may be performed, at least partially, by one or more processors 1002 that are temporarily configured (for example, by software) or permanently configured to perform the relevant operations. Whether temporarily or permanently configured, such processors 1002 may constitute processor-implemented modules that operate to perform one or more operations or functions. The modules referred to herein may, in some example embodiments, include processor-implemented modules.

Similarly, the methods described herein may be at least partially processor-implemented. For example, at least some of the operations of a method may be performed by one or more processors 1002 or processor-implemented modules. The performance of certain of the operations may be distributed among the one or more processors 1002, not only residing within a single machine but deployed across a number of machines. In some example embodiments, the processors 1002 may be located in a single location (for example, within a home environment, within an office environment, or as a server farm), while in other embodiments, the processors 1002 may be distributed across a number of locations.

While the embodiments are described with reference to various implementations and exploitations, it will be understood that these embodiments are illustrative and that the scope of claims provided below is not limited to the embodiments described herein. In general, the techniques described herein may be implemented with facilities consistent with any hardware system or hardware systems defined herein. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the claims and their equivalents.

What is claimed is:

1. A method, comprising:
receiving a first informational code in response to the first informational code being generated during execution of a software application for a user;
selecting, using a hardware processor, from a data storage device a first character string from a plurality of character strings after the generation of the first informational code, the plurality of character strings corresponding to the first informational code and the selection based on identifying information; and
transmitting the first character string for display to the user.

2. The method of claim 1, the identifying information comprising one or more of an identity of the software application being executed, a version of the software application being executed, an identity of a component of the software application, a name of the user, an identity of a group of other users with which the user is associated, and a desired language of the user.

3. The method of claim 1, the first informational code representing an error condition occurring during the execution of the software application, and the first character string comprising at least one of a description of the error condition and a description of a solution for the error condition that is implementable by the user.

4. The method of claim 1, the first informational code representing a logging entry generated during the execution of the software application, and the first character string comprising a description of a task performed by the software application during the execution of the software application.

5. The method of claim 1, the first informational code representing a trace output generated during the execution of the software application, and the first character string comprising a description of a location within a source file defining the software application.

6. The method of claim 1, further comprising:
receiving a second character string descriptive of the first informational code;
storing the second character string in the data storage device, the second character string being associated with the first informational code in the data storage device;
presenting the user with a choice between a first group of character strings comprising the first character string and a second group of character strings comprising the second character string; and
receiving a selection for the first group of character strings from the user in response to the presenting of the choice;
the retrieving from the data storage device of the first character string being based on the selection.

7. The method of claim 1, further comprising:
receiving a second character string descriptive of the first informational code;
storing the second character string in the data storage device, the second character string being associated with the first informational code in the data storage device; and
accessing an indication of an identity of the user.

8. The method of claim 1, further comprising:
receiving a second character string descriptive of the first informational code;
storing the second character string in the data storage device, the second character string being associated with the first informational code in the data storage device; and
accessing an indication of a version of the software application;
the retrieving from the data storage device of the first character string being based on the indication of the version of the software application.

9. The method of claim 1, the first character string including a variable, the method further comprising replacing the variable within the first character string with a second character string represented by the variable before the transmitting of the first character string for display to the user of the software application.

10. The method of claim 1, further comprising:
retrieving from the data storage device at least one preexisting character string based on the first informational code; and
transmitting the at least one preexisting character string for display to the user, the receiving of the first character string being in response to the transmitting of the at least one preexisting character string.

11. A non-transitory computer-readable storage medium comprising instructions that, when executed by at least one processor of a machine, cause the machine to perform operations comprising:
receiving a first informational code in response to the first informational code being generated during execution of a software application for a user;
selecting from a data storage device a first character string from a plurality of character strings after the generation of the first informational code, the plurality of character strings corresponding to the first informational code and the selection based on identifying information; and
transmitting the first character string for display to the user.

12. The non-transitory computer-readable storage medium of claim 11, the identifying information comprising one or more of an identity of the software application being executed, a version of the software application being executed, an identity of a component of the software application, a name of the user, an identity of a group of other users with which the user is associated, and a desired language of the user.

13. A system comprising:
at least one processor; and
modules comprising instructions that are executable by the at least one processor, the modules comprising:
a communication interface module to receive a plurality of character strings, each of the character strings being descriptive of at least one of the informational codes; and
an information manager module, implemented with at least one hardware processor, to store the plurality of character strings in a data storage device;
the communication interface module to receive a first informational code in response to the first informational code being generated during execution of a software application for a user;
the information manager to select from the data storage device a first character string from the plurality of character strings after the generation of the first informational code, the plurality of character strings corresponding to the first informational code and the selection based on identifying information; and
the communication interface module to transmit the first character string for display to the user.

14. The system of claim 13, the information manager module to retrieve at least one preexisting character string from the data storage device, and the communication interface module to transmit the at least one preexisting character string to the user.

15. The system of claim 13, the information manager module to retrieve the first character string from the data storage device based on an identity of the user, and the communication interface module to transmit the first character string to the user.

16. The system of claim 13, the information manager module to retrieve at least one of the character strings written in an identified human-readable language from the data storage device, and the communication interface module to transmit the first character string written in the human-readable language to the user.

17. The system of claim 13, the information manager module to retrieve at least one of the character strings applicable to an identified version of the software application from the data storage device, and the communication interface module to transmit the at least one character string applicable to the version of the software application to the user.

18. The system of claim 13, the information manager module to retrieve at least one character string descriptive of the first informational code from the data storage device, and the communication interface module to transmit the at least one character string to the user.

19. The system of claim 13, the information manager module to retrieve at least one character string descriptive of the first informational code from the data storage device based on an identity of the user, and the communication interface module to transmit the at least one character string to the user.

20. The system of claim 13, at least one of the informational codes representing at least one of an error condition occurring during the execution of the software application, a logging entry generated during the execution of the software application, and a trace output generated during the execution of the software application.

* * * * *